(12) United States Patent
Pederson

(10) Patent No.: US 11,932,834 B2
(45) Date of Patent: Mar. 19, 2024

(54) METHOD AND DEVICE FOR ADDING HOPS TO A FERMENTATION VESSEL

(71) Applicant: Mad Mole Brewing LLC, Wilmington, NC (US)

(72) Inventor: Ole Arthur Pederson, Wilmington, NC (US)

(73) Assignee: Mad Mole Brewing LLC, Wilmington, NC (US)

( * ) Notice: Subject to any disclaimer, the term of this patent is extended or adjusted under 35 U.S.C. 154(b) by 898 days.

(21) Appl. No.: 16/861,517

(22) Filed: Apr. 29, 2020

(65) Prior Publication Data

US 2020/0354657 A1  Nov. 12, 2020

Related U.S. Application Data

(60) Provisional application No. 62/845,344, filed on May 9, 2019.

(51) Int. Cl.
| | |
|---|---|
| *C12C 13/00* | (2006.01) |
| *C12C 3/00* | (2006.01) |
| *C12C 11/00* | (2006.01) |
| *G05D 7/06* | (2006.01) |

(52) U.S. Cl.
CPC ............ *C12C 13/00* (2013.01); *C12C 11/006* (2013.01); *G05D 7/0605* (2013.01); *C12C 3/00* (2013.01)

(58) Field of Classification Search
CPC .......... C12C 13/00; C12C 11/006; C12C 3/00
USPC .......................................................... 426/600
See application file for complete search history.

(56) References Cited

FOREIGN PATENT DOCUMENTS

| CA | 3053224 A1 | * | 10/2018 | .............. C12C 11/11 |
|---|---|---|---|---|
| EP | 2500408 A1 | * | 9/2012 | .............. C12C 11/11 |
| EP | 3344743 A1 | * | 7/2018 | .............. B01J 4/008 |
| GB | 2531054 A | * | 4/2016 | .............. C12C 11/11 |

* cited by examiner

*Primary Examiner* — Subbalakshmi Prakash
(74) *Attorney, Agent, or Firm* — NK Patent Law

(57) ABSTRACT

Assembly for regulating flow of hops into a fermentation vessel includes a hollow cross-shaped connector including a first cylindrical housing intersecting a second cylindrical housing at an approximate right angle. A rotary shaft coaxially mounted within the first cylindrical housing supports a hub and uniformly spaced vanes at a proximal end with outer ends of each vane adapted to sweep in close engagement with an inner wall of the first cylindrical housing. An actuator coupled to a distal end of the shaft is configured to control rotation of the shaft to control flow of hops from a hopper configured for holding hops into a hatch of a fermentation vessel configured for holding fermenting fluid. An outlet of the second cylindrical housing sealably connects to the hatch of the fermentation vessel, and an inlet of the second cylindrical housing sealably connects to an aperture of the hopper.

11 Claims, 12 Drawing Sheets

METHOD AND DEVICE FOR ADDING HOPS TO A FERMENTATION VESSEL

CROSS-REFERENCE TO RELATED APPLICATIONS

This application claims priority to U.S. Provisional Patent Application 62/845,344 filed on May 9, 2019, the contents of which is hereby incorporated by reference in its entirety.

TECHNICAL FIELD

The present invention relates generally to preparing alcoholic beverages, and particularly, to a system and method for controlling addition of hops to a beer fermenting process.

BACKGROUND

During the preparation of alcoholic beverages such as beer, hop is often added to the fermenting fluid for purposes such as adding aroma, flavor, and/or bitterness to the beer. There is a wide array of approaches to how hop is added to the fermenting fluid, important among them being the dry hopping approach. Dry hopping involves the addition of hop after the beer has fermented to provide a hoppy burst of aroma to the beer, and dry hopping generally does not add bitterness to the beer.

In dry hoping, hop is typically added to the fermenting fluid at the secondary fermenting stage before bottling or kegging of the beer. To carry out the dry hoping process, the fermentation vessel containing the fermenting fluid needs to be opened in order to introduce the hop. However, opening of the fermentation vessel can result in gases formed over the fermenting fluid escaping into the outside atmosphere, and further in the introduction of air from the outside atmosphere into the fermentation vessel. The resulting modification of the inside atmosphere within the fermentation vessel during the dry hopping process can affect the aroma, flavor, bitterness, and taste of the ultimately brewed beer.

Opportunities exist for introducing hops into a fermenting fluid during the fermenting of an alcoholic beverage in a manner that minimizes the modification of the internal atmosphere of a fermentation vessel during the introduction of hops to thereby improve the quality of the alcoholic beverage.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is a regulator assembly for regulating flow of hops into fermentation vessel for preparing an alcoholic beverage. According to various embodiments, the regular comprises a hollow cross-shaped connector including a first cylindrical housing intersecting a second cylindrical housing at an approximate right angle with openings therethrough; a rotary shaft coaxially mounted within the first cylindrical housing, the shaft supporting a hub and uniformly spaced radial vanes at a proximal end, outer ends of each vane adapted to sweep in close engagement with an inner wall of the first cylindrical housing; and an actuator coupled to a distal end of the shaft, the actuator configured to control rotation of the shaft to control flow of hops from a hopper configured for holding hops into a hatch of a fermentation vessel configured for holding fermenting fluid. An outlet of the second cylindrical housing sealably connects to the hatch of the fermentation vessel, and an inlet of the second cylindrical housing sealably connects to an aperture of the hopper.

According to one or more embodiments, the actuator comprises a gear motor configured for rotating the shaft.

According to one or more embodiments, the actuator comprises a timer configured for regulating the rotation of the shaft.

According to one or more embodiments, the regulator assembly further comprises a valve to control access to the hatch of the fermentation vessel.

According to one or more embodiments, the hollow cross-shaped connector has internal diameter of approximately 4 inches.

According to one or more embodiments, the actuator comprises a timer configured for rotating the shaft for a fixed time period.

According to one or more embodiments, the actuator comprises a timer configured for rotating the shaft for a first period of time followed by stopping rotation of the shaft for a second period time followed by rotating the shaft for a third period of time.

According to one or more embodiments, ends of the first cylindrical housing include airtight seals.

According to one or more embodiments, the shaft includes one or more bearings to facilitate rotation of the shaft.

According to one or more embodiments, the vanes are made of plastic.

According to one or more embodiments, the hopper includes a valve configured for purging the air within the hopper and the enclosed path between the hatch of the fermentation vessel and the aperture of the hopper.

Disclosed herein is an automated system for regulating flow of hops into a fermentation vessel for fermenting an alcoholic beverage. In various embodiments, the system comprises a regulator assembly. The regulator assembly comprises a hollow cross-shaped connector including a first cylindrical housing intersecting a second cylindrical housing at an approximate right angle with openings therethrough; a rotary shaft coaxially mounted within the first cylindrical housing, the shaft supporting a hub and uniformly spaced radial vanes at a proximal end, outer ends of each vane adapted to sweep in close engagement with an inner wall of the first cylindrical housing; and, an actuator coupled to a distal end of the shaft, the actuator configured to control rotation of the shaft to control flow of hops from a hopper configured for holding hops into a hatch of a fermentation vessel configured for holding a fermenting fluid. An outlet of the second cylindrical housing sealably connects to the hatch of the fermentation vessel. An inlet of the second cylindrical housing sealably connects to an aperture of the hopper. The system further comprises a user interface configured for receiving a user input; and a controller coupled to the actuator, the controller configured to adjust at least one operating parameter associated with the actuator responsive to the user input received at the user interface.

According to one or more embodiments, the controller comprises a timer configured for regulating a rotation characteristic of the shaft of the regulator assembly.

According to one or more embodiments, the controller is configured for communicating with a central server over a wireless network.

According to one or more embodiments, the user interface comprises one or more of: a display screen, a keyboard, and a selection knob.

According to one or more embodiments, the controller comprises a rechargeable battery.

According to one or more embodiments, the system further comprises a sensor in electronic communication with the controller, wherein the controller is configured to stop the rotation of the shaft when the sensor detects that the hopper is devoid of hops.

According to one or more embodiments, the controller is configured to maintain a predetermined flow rate of hops into the hatch of the fermentation vessel.

According to one or more embodiments, the system further comprises a memory in electronic communication with the controller, wherein the controller is configured to store at the memory data associated with the flow of hops from the hopper into the hatch of the fermentation vessel.

According to one or more embodiments, the controller comprises a timer configured for rotating the shaft for a first time interval followed by stopping rotation of the shaft for a second time interval followed by rotating the shaft for a third time interval.

Disclosed herein is a method of regulating flow of hops into a fermentation vessel for fermenting an alcoholic beverage. According to various embodiments, the method comprises providing a regulator assembly. The regulator assembly comprises a hollow cross-shaped connector including a first cylindrical housing intersecting a second cylindrical housing at an approximate right angle with openings therethrough; a rotary shaft coaxially mounted within the first cylindrical housing, the shaft supporting a hub and uniformly spaced radial vanes at a proximal end, outer ends of each vane adapted to sweep in close engagement with an inner wall of the first cylindrical housing; and, an actuator coupled to a distal end of the shaft, the actuator configured to control rotation of the shaft to control flow of hops from a hopper configured for holding hops into a hatch of a fermentation vessel configured for holding a fermenting fluid. An outlet of the second cylindrical housing sealably connects to the hatch of the fermentation vessel. An inlet of the second cylindrical housing sealably connects to an aperture of the hopper. The method further comprises receiving an input at a user interface; and adjusting, by a controller in communication with the actuator, of at least one operating parameter associated with the actuator responsive to the user input received at the user interface.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

Figure 1:
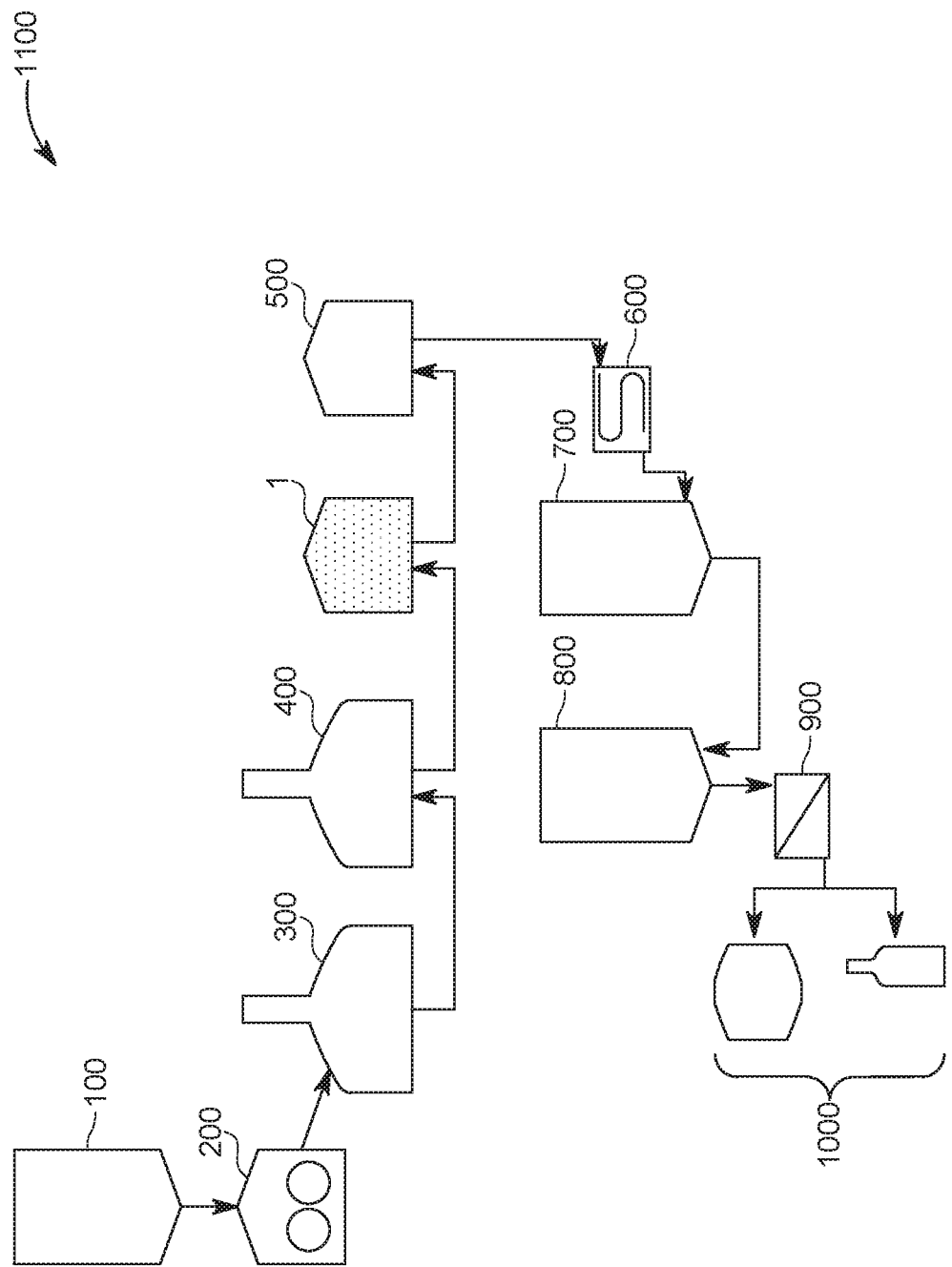
FIG. 1 is a schematic illustration of a beer brewing equipment, according to one or more embodiments of the presently disclosed subject matter.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

As shown in FIG. 1, in various embodiments, brewing a beer or a malt based beverage comprises feeding malt (step 100) to a grinder (step 200) which is then mixed with water and mashed (step 300) at a moderately high temperature to enable enzymatic conversion of starches into fermentable sugars. In the lautering step (step 400), the mash is separated into a clear liquid wort and a residual grain. The separated liquid wort is then fed to a boil kettle, in a step traditionally referred to as "boiling" step because the wort is typically heated above its boiling temperature to sterilize it, terminate enzymatic activity, and convert and/or remove undesired components. After the boiling step, trub that has formed during the boiling step is separated from the wort usually in a whirlpool tun (step 500). Wort is then cooled (step 600), fermented (step 700), matured (step 800), filtered (step 900) and packaged (step 1000), e.g., in bottles, kegs, cans, and the like.

Dry hopping typically includes adding compressed hop cones or hop pellets to beer or fermenting fluid, with such addition of hop occurring at step 700 (see FIG. 1) in one embodiment. Embodiments of the presently disclosed subject matter can advantageously permit the addition of hop to the fermenting fluid present in the fermentation vessel in a manner that prevents or limits the unintended escape of gases formed over the fermenting fluid within the fermentation vessel into the outside atmosphere, as well as unintended introduction of air from the outside atmosphere into the fermentation vessel. Embodiments of the presently disclosed subject matter can thereby advantageously operate to improve the flavor of the beer brewed.

Embodiments of the presently disclosed subject matter can also advantageously provide an automated process for adding hops to the fermenting fluid during the dry hopping process to thereby provide for consistency in the flavor of the beer brewed. Embodiments of the presently disclosed subject matter can be advantageously applied during the dry hoping process or during any other process of adding hops or similar other materials to a fermenting fluid when preservation or control of the internal atmosphere of the fermentation vessel is desired.

In various embodiments, embodiments of the currently disclosed subject matter can be used in a wide array of hopping techniques including mash hopping, first wort hops, dry hops, boil hops, and late hop additions. Embodiments of the present disclosed subject matter can be advantageously applied in brewing and fermenting environments of all sizes including commercial and home brewing.

Figure 2:
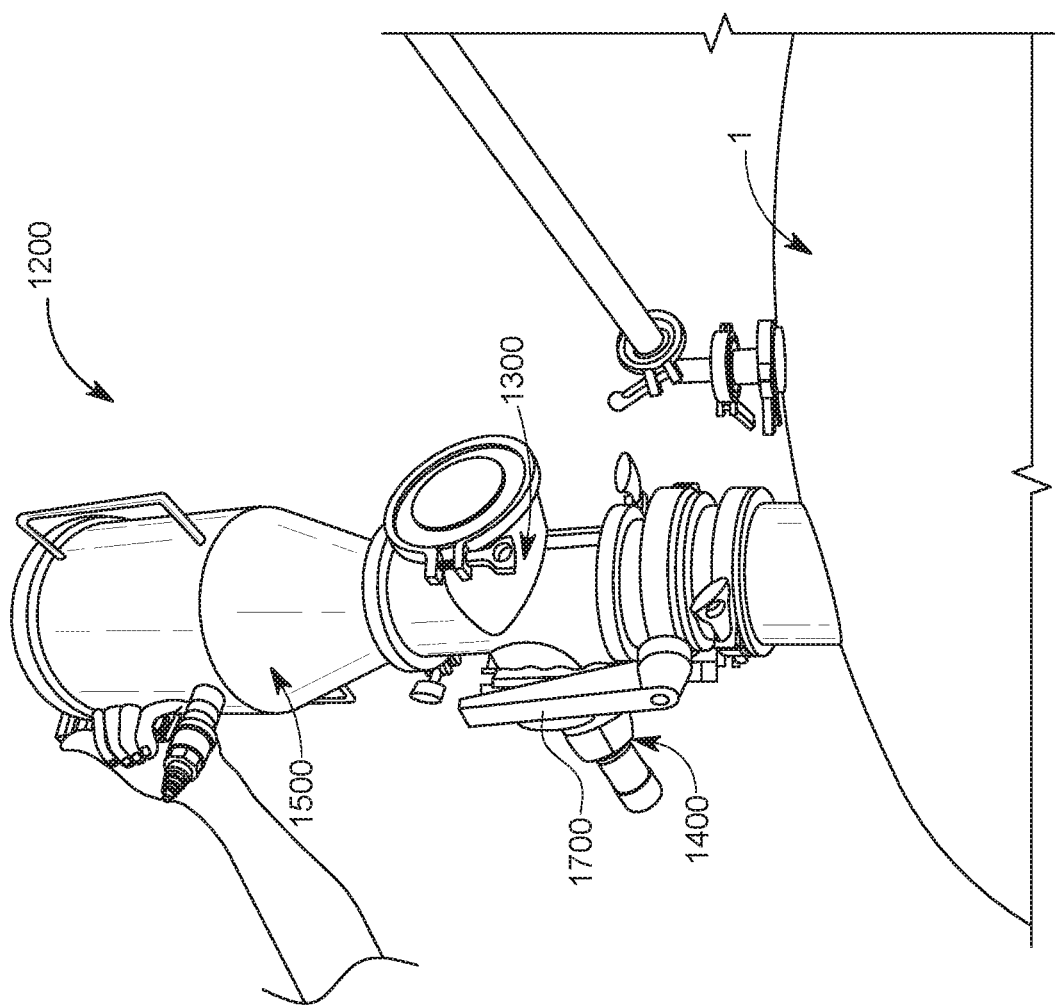
FIG. 2 is a perspective view of a hop feed set-up, according to one or more embodiments of the presently disclosed subject matter.
Figure 3:
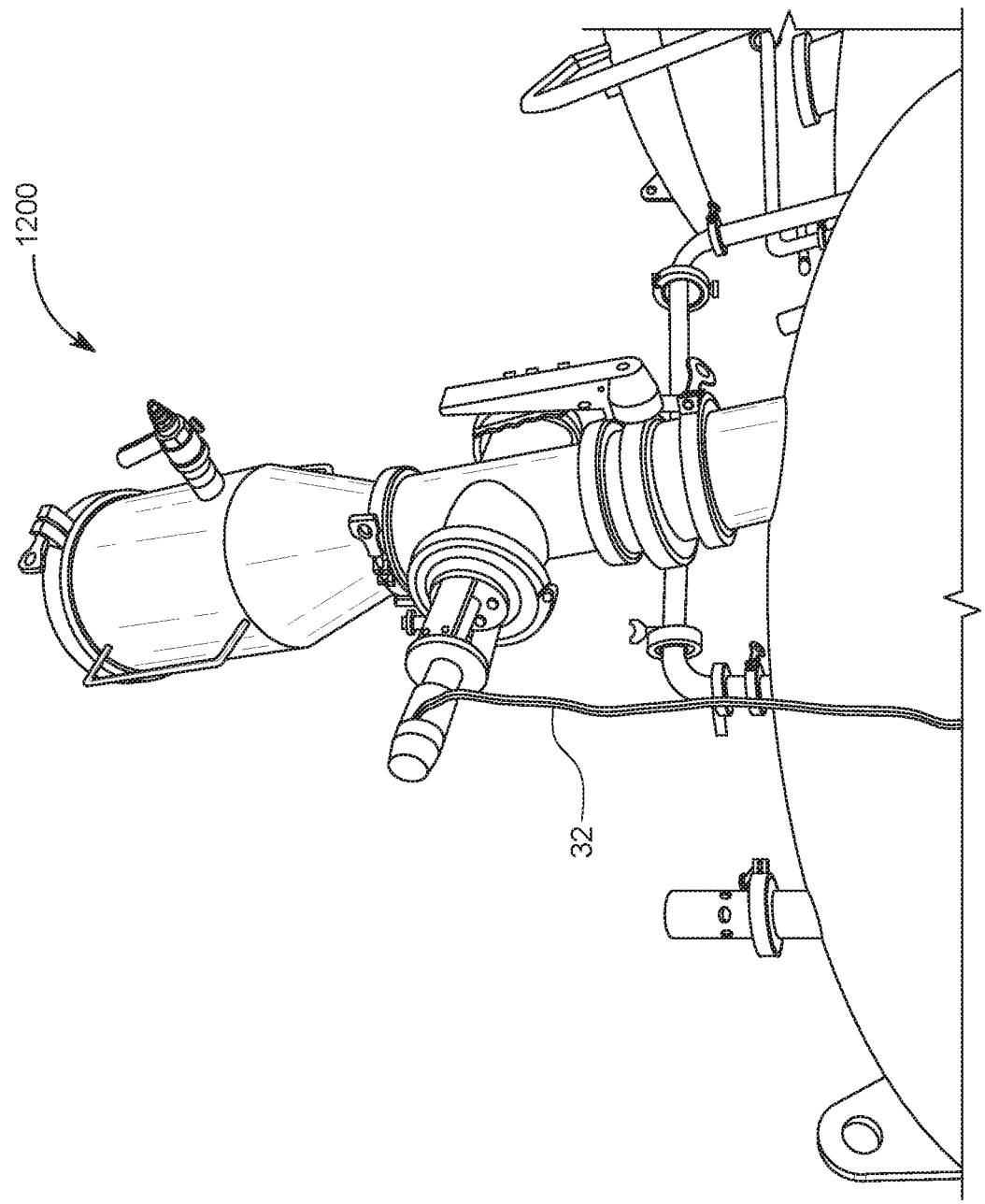
FIG. 3 is a perspective view of a hop feed set-up, according to one or more embodiments of the presently disclosed subject matter.
Figure 6:
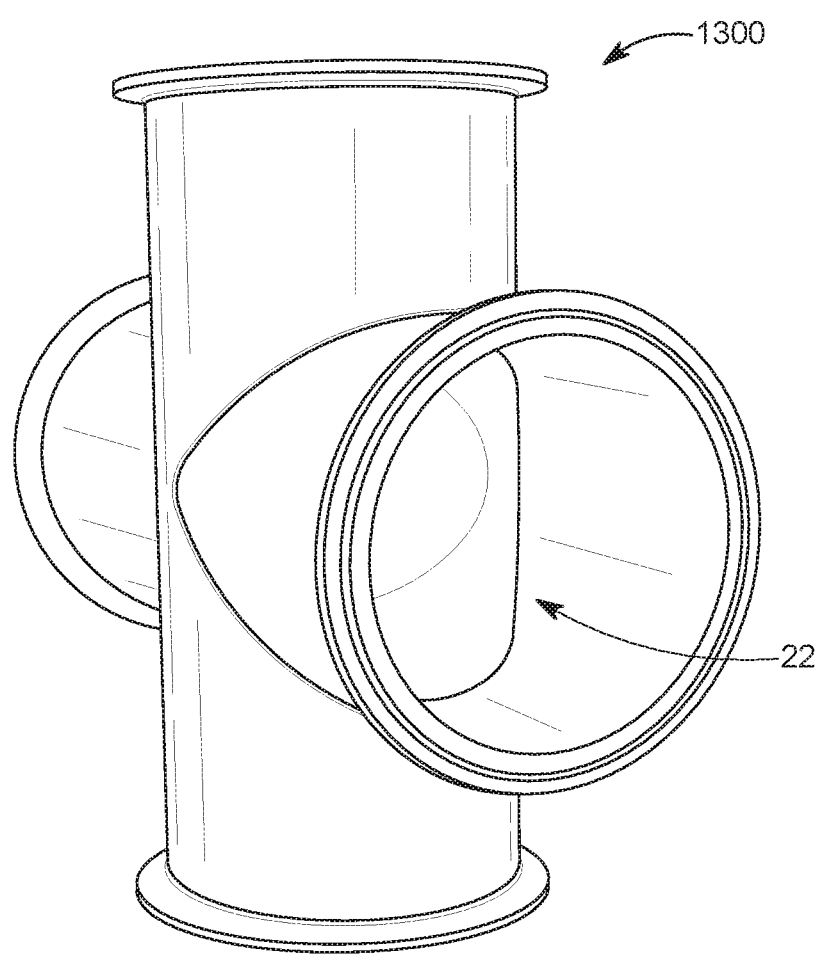
FIG. 6 is a perspective view of the tri-clamp cross of the regulator assembly, according to one or more embodiments of the presently disclosed subject matter.

FIG. 2 illustrates a hop-feed setup 1200 with regulator assembly 1400 mounted therein, according to one or more embodiments of the presently disclosed subject matter. As shown in FIG. 2, hop-feed setup 1200 includes a hopper 1500, a regulator assembly 1400, a valve 1700, and a fermentation vessel 1 (fermentation vessel 1 of FIG. 2 is analogous to the fermentation vessel at step 700 of FIG. 1). Regulator assembly 1400 includes a tri-clamp cross connector 1300 (FIG. 6 provides a separate illustration of the tri-clamp cross connector 1300). Regulator assembly 1400 includes tri-clamp cross connector 1300. FIG. 3 illustrates another view of hop-feed setup 1200.

Figure 4:
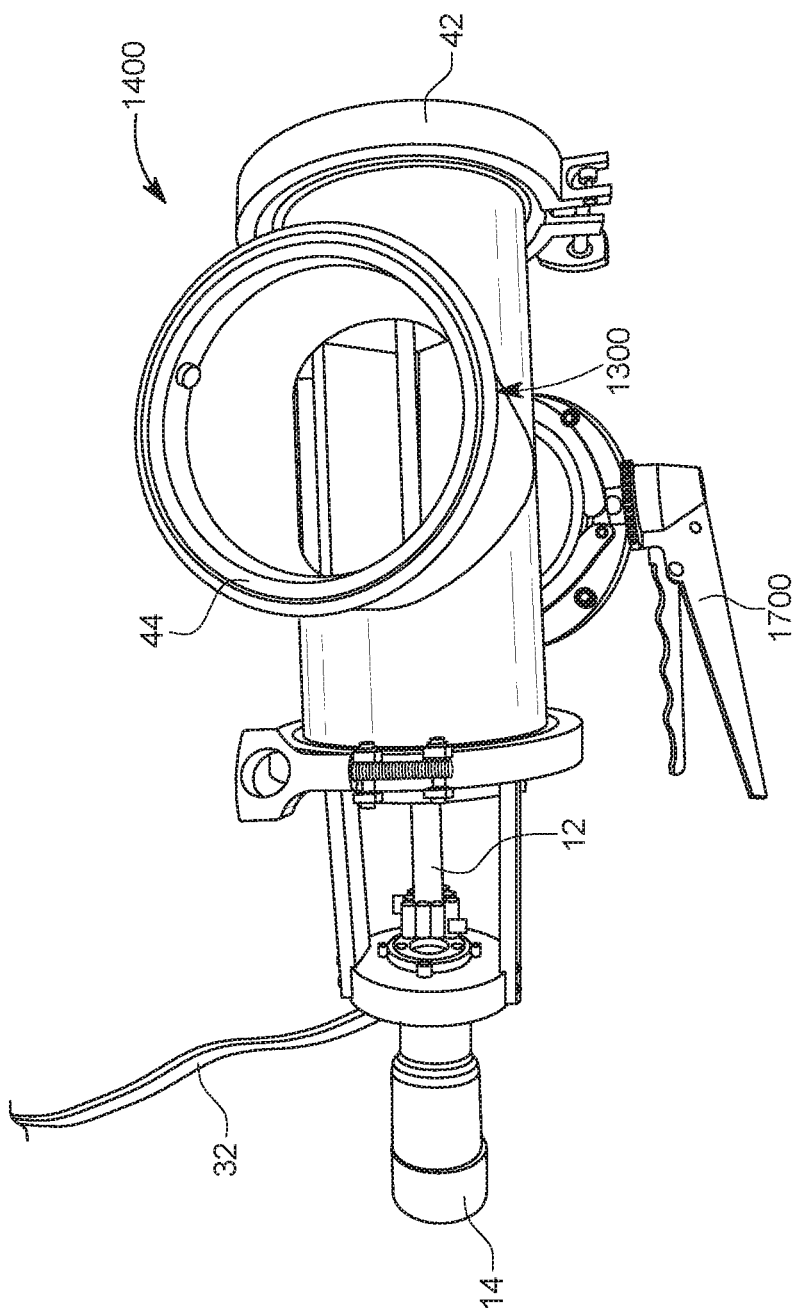
FIG. 4 is a perspective view of a regulator assembly associated with a hop feed set-up, according to one or more embodiments of the presently disclosed subject matter.
Figure 5:
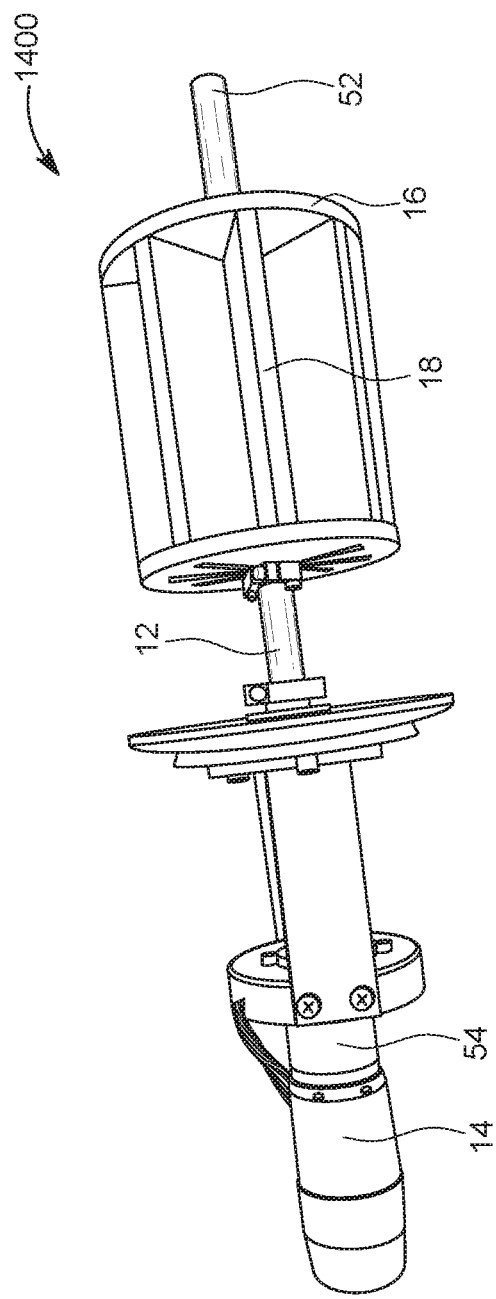
FIG. 5 is a perspective view of a regulator assembly associated with a hop feed set-up with a tri-clamp cross of the regulator assembly removed, according to one or more embodiments of the presently disclosed subject matter.

FIGS. 4 and 5 illustrate regulator assembly 1400 according to one or more embodiments of the presently disclosed subject matter. As shown in FIGS. 4 and 5, the major components of regulator assembly 1400 include shaft 12, tri-clamp cross connector 1300, valve 1700, first cylindrical housing 42 and second cylindrical housing 44. FIG. 5 shows regulator assembly 1400 with tri-clamp cross connector 1300 removed for ease of illustration of the components therein. As shown in FIG. 5, regulator assembly 1400 includes actuator 14 at distal end 54, and a hub 16 including uniformly spaced radial vanes 18 at proximal end 52. As shown in FIG. 6, tri-clamp cross connector 1300 includes an opening 22 within which the structure illustrated in FIG. 5 fits into snuggly such that actuator 14 extends outside of the opening 22 (for example, see FIGS. 2, 3 and 4 wherein actuator 14 extends outside of opening 22 of tri-clamp cross connector 1300). In at least one embodiments, actuator 14 is connected to a power source through power supply conduit 32. Power supply conduit 32 operates to supply power to various electrical components of regulator assembly 1400 in general, and actuator 14 in particular.

In various embodiments, regulator assembly 1400 can advantageously be used for regulating flow of hops into fermenting fluid contained in fermentation vessel 1 for preparing an alcoholic beverage. According to various embodiments, regulator assembly 1400 comprises a hollow cross-shaped connector such as tri-clamp cross connector 1300. As shown in FIG. 4, tri-clamp cross connector 1300 includes a first cylindrical housing 42 intersecting a second cylindrical housing 44 at an approximate right angle with openings such as opening 22 (see FIG. 6) therethrough. Shaft 12 is coaxially mounted within the first cylindrical housing 42, the shaft supporting a hub 16 and uniformly spaced radial vanes 18 at proximal end 52, outer ends of each vane adapted to sweep in close engagement with an inner wall of the first cylindrical housing. Actuator 14 is coupled to distal end 54 of shaft 12. Actuator 14 is configured to control rotation of shaft 12 to control flow of hops from hopper 1500 configured for holding hops into a hatch of fermentation vessel 1 configured for holding fermenting fluid. An outlet of second cylindrical housing 44 sealably connects to the hatch of the fermentation vessel, and an inlet of second cylindrical housing 44 sealably connects to aperture 78 of hopper 1500.

Figure 7:
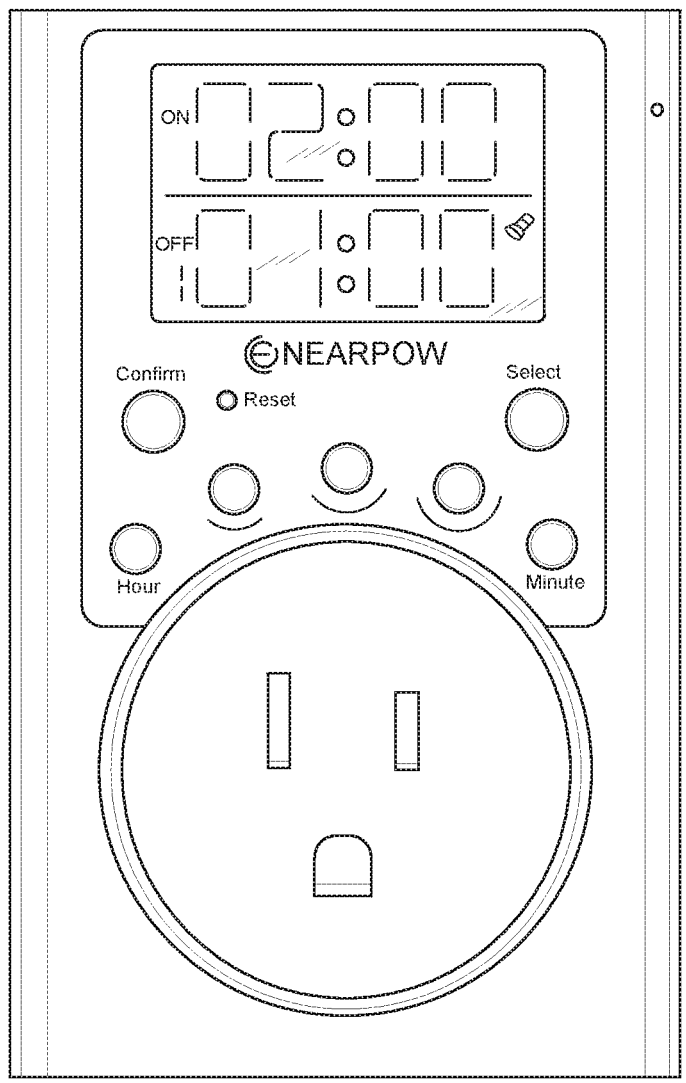
FIG. 7 is a perspective view of a timer forming part of the regulator assembly, according to one or more embodiments of the presently disclosed subject matter.

According to one or more embodiments, actuator 14 comprises a gear motor configured for rotating the shaft based on signals supplied by the actuator 14. According to one or more embodiments, actuator 14 is in electrical communication with timer 1600. Timer 1600 can be configured for regulating the rotation of the shaft via actuator 14, and in particular, regulate the operations of the gear motor of actuator 14 to thereby control the flow of hops into the fermentation vessel 1. Accordingly, in some embodiments, a timer such as timer 1600 as illustrated in FIG. 7 is electrically coupled to actuator 14 to control the operations of actuator 14, and thereby the rotation of shaft 12. In various embodiments, actuator 14 is coupled to, or includes, a timer configured for regulating the rotation of the shaft. Timer 1600 can be programmed to operate the actuator for rotating the shaft for a fixed time period. In at least one embodiment, timer 1600 can operate to cause the shaft to rotate for a first period of time, followed by causing the rotation of the shaft to stop for a second period time, followed by causing the shaft to rotate again for a third period of time. Accordingly, timer 1600 is configured for rotating the shaft for a first period of time, followed by stopping rotation of the shaft for a second period time, followed by rotating the shaft for a third period of time, and so on. The timer 1600 can be programmed to thereby automate the process for adding hops by the regulator assembly 1400 to the fermentation fluid during the dry hopping process to thus provide for consistency in the flavor of the beer brewed.

Figure 8:
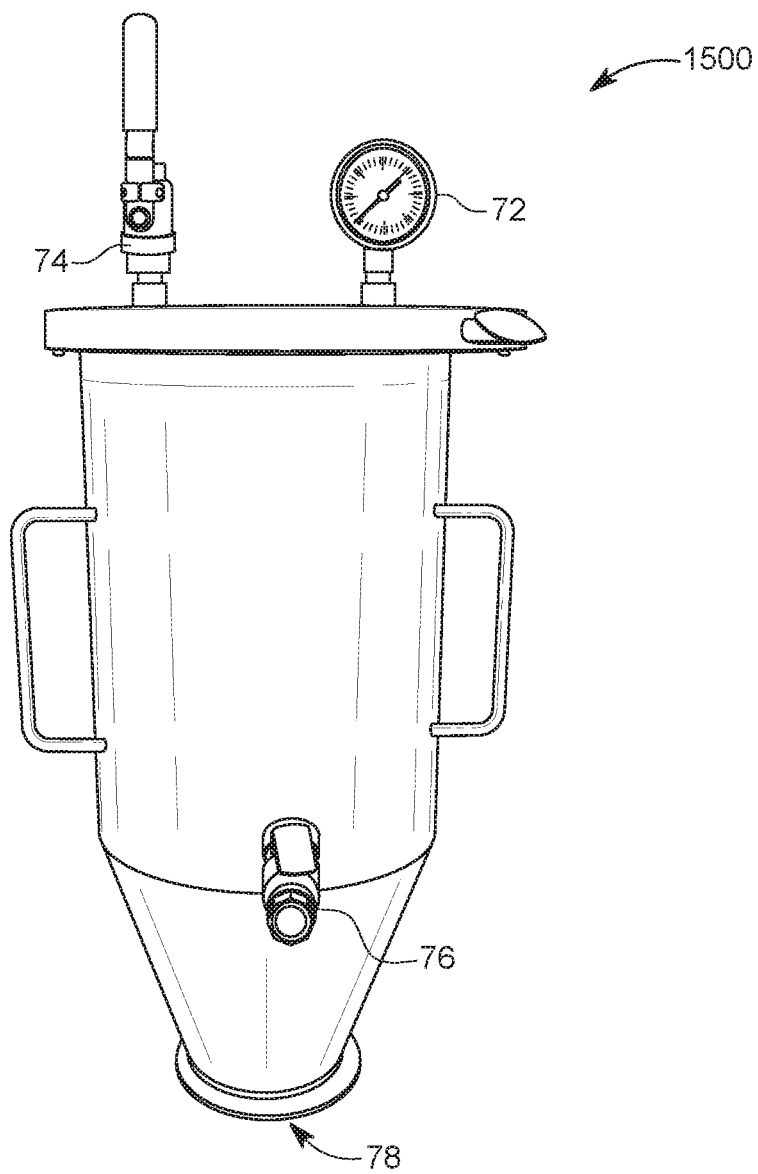
FIG. 8 is a perspective view of a hopper forming part of the hop feed set-up, according to one or more embodiments of the presently disclosed subject matter.

FIG. 8 illustrates hopper 1500 that attaches to regulator assembly 1400 such that regulator assembly 1400 is positioned between fermentation vessel 1 and hopper 1500. As illustrated in FIG. 8, hopper 1500 includes top valve 74 for allowing a fluid or a substance to flow into an interior of hopper 1500, pressure gauge 72 to display the pressure sensed within the interior of hopper 1500, side valve 76 for allowing a fluid or a substance to flow out from the interior of hopper 1500, and aperture 78 for hops to flow into fermentation vessel 1 as regulated by regulator assembly 1400. Accordingly, in various embodiments, hopper 1500 is provided with one or more valves such as top valve 74 and side valve 76 configured for purging the air within hopper 1500 and the space within the enclosed path between the hatch of the fermentation vessel and aperture 78 of hopper 1500 before the process of regulated addition of hops to the fermentation vessel 1 commences.

In at least one embodiment, an auger arrangement may be provided instead of the hub and vanes arrangement as illustrated in FIG. 5 whereby the shaft of the auger is set up to be parallel to the first cylindrical housing 42. In other words, the auger's shaft is set up to be coaxial within the first cylindrical housing 42. In a further embodiment, the auger arrangement may be provided instead of the hub and vanes arrangement whereby the shaft of the auger is set up to be parallel to the second cylindrical housing 44; in other words, the auger's shaft is set up to be coaxial within the second cylindrical housing 44. In such embodiments, the rotation of the auger within the first cylindrical housing 42 or the second cylindrical housing 44 can be regulated by the actuator in an automated manner to thereby provide for an automated process for adding hops to the fermenting fluid during the dry hopping process to thereby provide for consistency in the flavor of the beer brewed.

According to one or more embodiments, the regulator assembly further comprises valve 1700 to control access to a hatch or an opening of fermentation vessel 1. In one embodiment, valve 1700 may be a butterfly valve. In one embodiment, valve 1700 may be a gate valve.

According to one or more embodiments, the first and second cylindrical housings of tri-clamp connector can have an internal diameter of approximately 4 inches. However, the diameter can be adjusted based on the requirements of the specific application.

According to one or more embodiments, ends of the first cylindrical housing include airtight seals to limit or prevent air movement into and out of the regulator assembly through the ends of the first cylindrical housing. On the other hand, a first end of second cylindrical housing can form an airtight seal with aperture 78 of hopper 1500 whereas a second end of second cylindrical housing can form an airtight seal with the hatch or opening of the fermentation vessel 1. Accordingly, in one embodiment, an airtight space is created between aperture 78 and the hatch of fermentation vessel 1. Various embodiments of the presently disclosed subject matter can provide for an airtight set-up that permits for the addition of hop to the fermenting fluid present in the fermentation vessel in a manner that prevents or limits the unintended escape of gases formed over the fermenting fluid within the fermentation vessel into the outside atmosphere, as well as unintended introduction of air from the outside atmosphere into the fermentation vessel 1.

Figure 9:
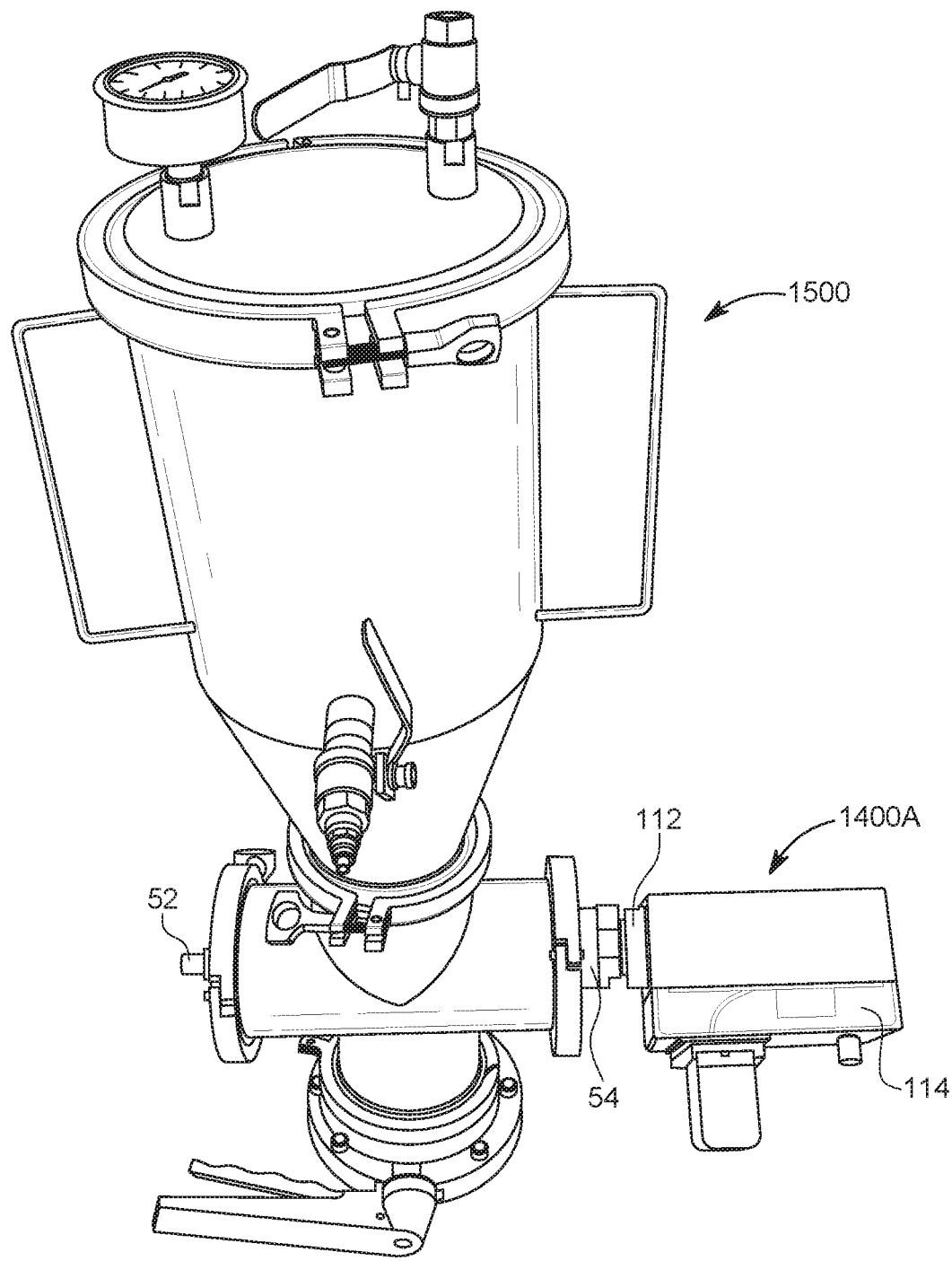
FIG. 9 is a perspective view of a regulator assembly associated with a hop feed set-up, according to one or more embodiments of the presently disclosed subject matter.
Figure 10:
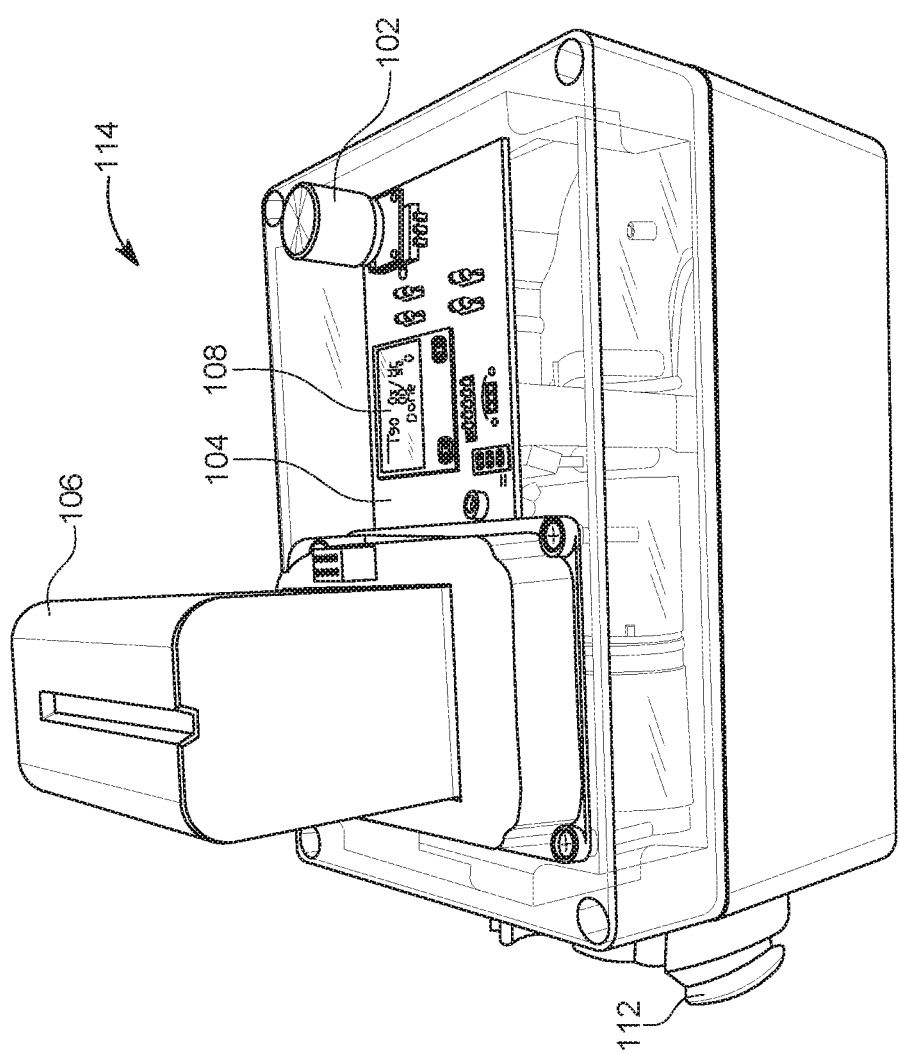
FIG. 10 is a front perspective view of an actuator forming part of a regulator assembly, according to one or more embodiments of the presently disclosed subject matter.

FIG. 9 illustrates a regulator assembly 1400A according to one or more embodiments of the presently disclosed subject matter. As illustrated in FIG. 9, regulator assembly 1400A comprises a self-contained and self-powered actuator 114. Actuator 114 can be detachably coupled to shaft 12 by a detachable coupling 112 whereby actuator 114 may be coupled to shaft 12 by a detachable coupling mechanism such as detachable coupling 112. In one embodiment, detachable coupling 112 can be in the form of a twist lock mechanism, for example. As illustrated in FIG. 10, actuator 114 can be coupled to, or otherwise include a controller such as microprocessor 104, a rechargeable battery 106, a user interface comprising components such as a screen display 108 and a knob 102. The controller (i.e., microprocessor 104) is coupled to the actuator 114. Actuator 114 can further include a wireless modem whereby the controller can communicate with a central server over a wireless network.

The controller is configured to adjust at least one operating parameter associated with the actuator 114 responsive to the user input received at the user interface. In one embodiments, the controller includes a built-in timer configured for regulating a rotation characteristic of the shaft of the regulator assembly. In other words, the built-in timer can perform the same or similar functions as timer 1600 as explained earlier with regard to FIG. 7. Thus, in various embodiments, the controller comprises a timer configured for rotating the shaft for a first time interval followed by stopping rotation of the shaft for a second time interval followed by rotating the shaft for a third time interval.

In various embodiments, actuator 114 can include a user interface. The user interface can comprises a display screen, a touch screen, touch sensitive buttons, a keyboard, a selection knob, and any other user interface features as is commonly known in the relevant art. The rechargeable battery 106 allows the actuator 114 to be self-powered thereby eliminating the need for connecting to a power supply. In one embodiment, rechargeable battery 106 represents an off-the-shelf rechargeable battery. In one embodiment, rechargeable battery 106 can be recharged through regular utility power by detaching the rechargeable battery from actuator 114 and plugging it into, or otherwise connecting to, a recharging device connected to regular utility power. In one embodiment, actuator 114 can include a converter that operates to recharge rechargeable battery 106 in place.

Regulator assembly 1400A can operate in an automated manner by the provision of an automated system by way of actuator 114 including microprocessor 104.

Microprocessor 104 monitors and controls the operations of adding hops to fermentation vessel 1. In one embodiment, the controller (i.e., microprocessor 104) can be configured for receiving and sending signals to the various components of beer brewing equipment 1100 to facilitate the automated monitoring and controlling of the operations of beer brewing equipment 1100 in general and regulator assembly 1400/1400A in particular. The user interface of actuator 114 can be configured for displaying various operating parameters associated with the operations of the regulator assembly 1400/1400A.

In some embodiments, a sensor is provided on regulator assembly 1400A, the sensor being configured to detect a flow of hops when the regulator assembly is rotating the shaft. The sensor is in electronic communication with the controller. When the sensor detects that no hops is flowing into the fermentation vessel 1 when the shaft is rotating, this may indicate that the hopper is devoid of hops. In at least one embodiment, the controller is configured to stop the rotation of the shaft when the sensor detects that the hopper is devoid of hops.

The controller operates to control, monitor and regulate the operations of actuator 114. For example, in one embodiment, the controller is configured to maintain a predetermined flow rate of hops into the hatch of the fermentation vessel. In one embodiment, actuator 114 further includes a memory in electronic communication with the controller. The controller is configured to store at the memory data associated with the flow of hops from the hopper into the hatch of the fermentation vessel. The controller can accordingly maintain (by storing in the memory) a history of the operations of regulator assembly 1400A in general, and that of actuator 114 in particular. The controller can further communicate the history (in the form of data) to the central server over the wireless network.

Figure 11:
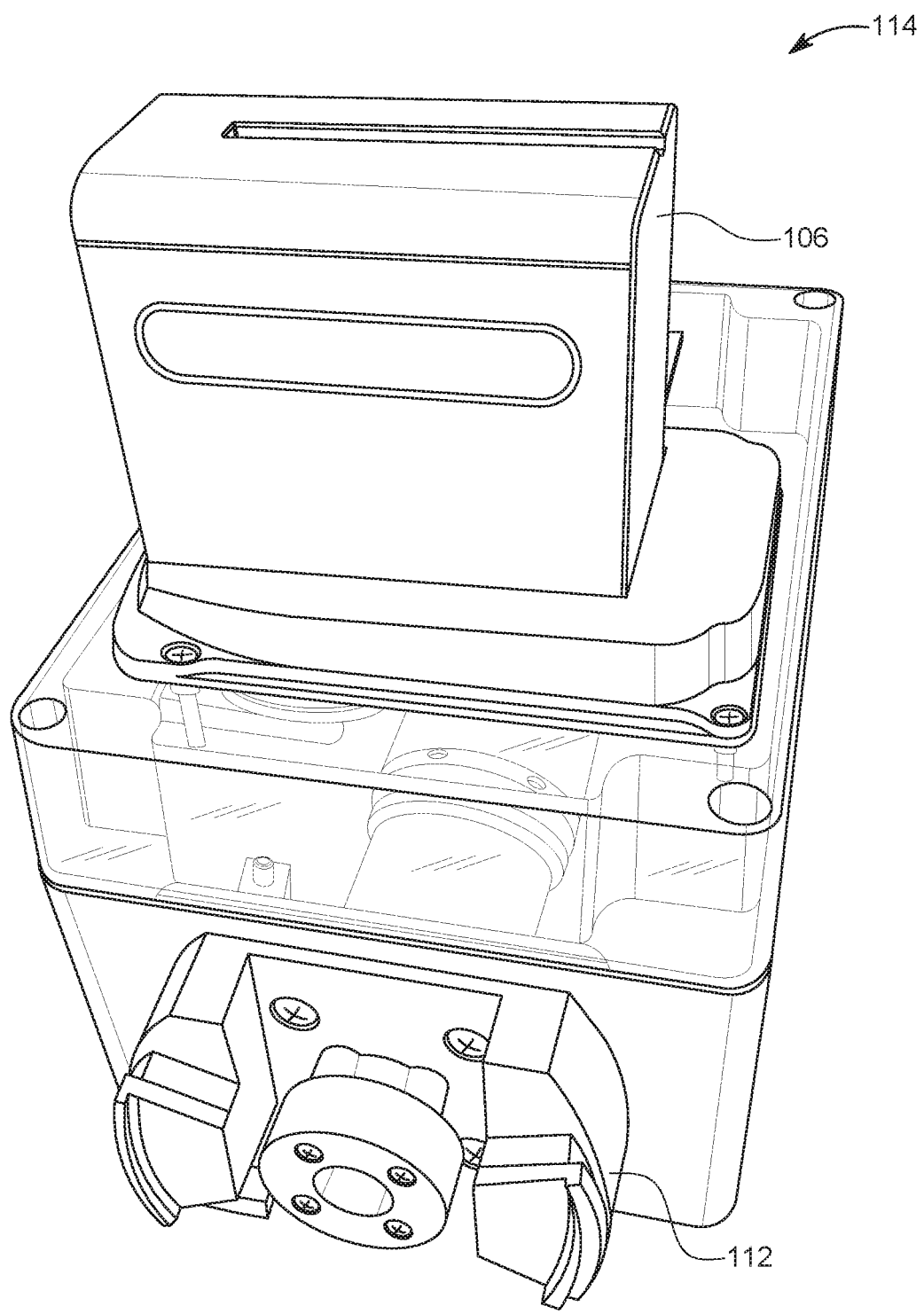
FIG. 11 is a side perspective view of an actuator forming part of a regulator assembly, according to one or more embodiments of the presently disclosed subject matter.

FIG. 11 illustrates detachable coupling 112 in the form of a twist locking mechanism whereby the actuator 114 can be engaged with shaft 12 via detachable coupling 112. When not in operation, actuator 114 can be disengaged from shaft 12 by untwisting the detachable coupling 112; actuator 114 as well as various components of regulator assembly 1400A can then be inspected, lubricated, cleaned, etc. before actuator 114 is again re-engaged with shaft 12 via detachable coupling 112.

Figure 12:
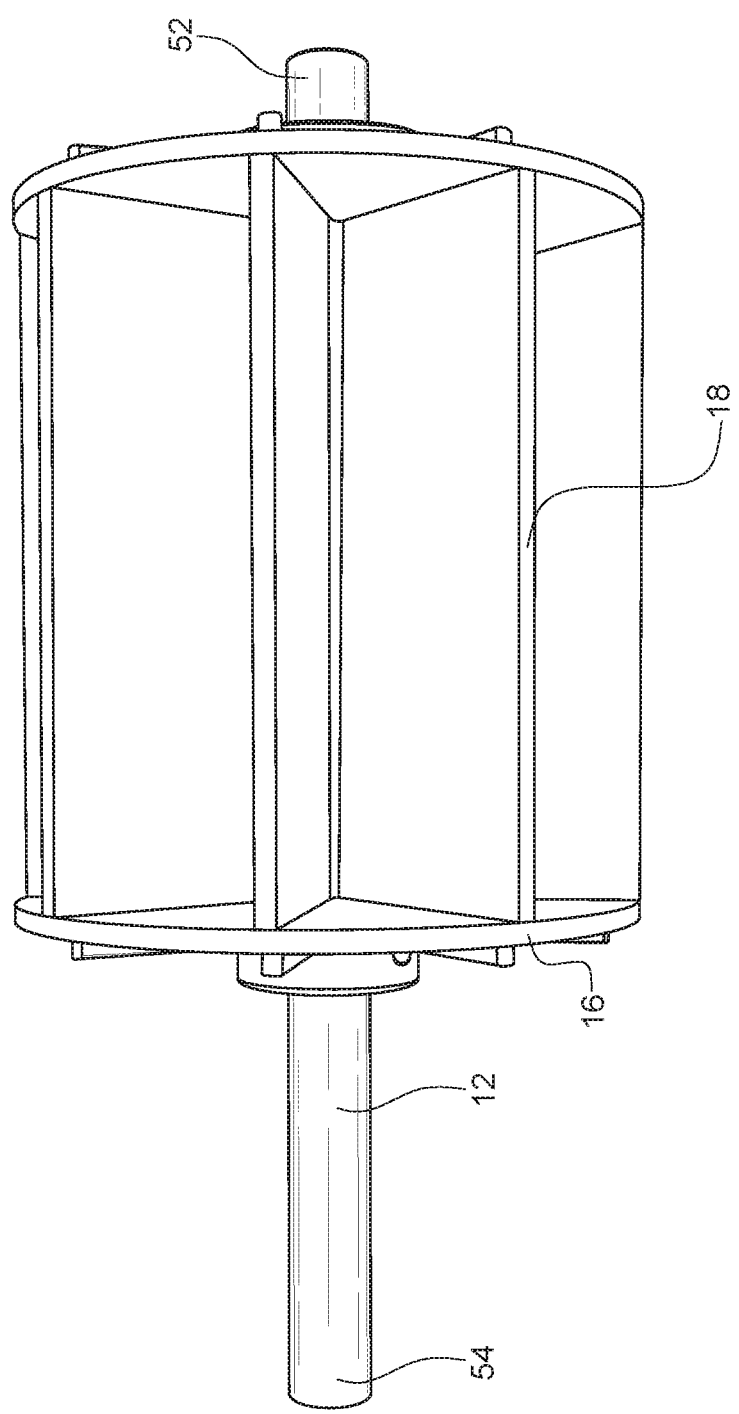
FIG. 12 is a side perspective view of a portion of a regulator assembly, according to one or more embodiments of the presently disclosed subject matter.

FIG. 12 illustrates a further embodiment of a portion of regulator assembly 1400A with a tri-clamp cross of the regulator assembly removed, according to one or more embodiments of the presently disclosed subject matter. FIG. 12 shows regulator assembly 1400A with tri-clamp cross connector 1300 removed for ease of illustration of the components therein. As shown in FIG. 12, regulator assembly 1400A includes a hub 16 including uniformly spaced radial vanes 18 at proximal end 52, and a distal end 54 that is configured for engaging with detachable coupling 112 of actuator 114. In various embodiments, microprocessor 104 can be controlled wirelessly by means of Wi-Fi connection. In at least one embodiment, screen display 108 provide for viewing menu options while knob 102 provides for selecting among various menu options. Actuator 114 further includes a sensor for detecting when hopper is empty so that microprocessor 104 can stop the shaft from spinning or rotating when the hopper is devoid of hops. Microprocessor 104 can be programmed to flow hops at a predetermined rate (e.g., 5 ounces per second) for a predetermined time interval (e.g., 5 minutes), and to further allow a predetermined time interval (e.g., 60 minutes) between hops additions. In one embodiment, one or more of shaft 12, hub 16, vanes 18 may be constructed of, or otherwise comprise, stainless steel. According to various embodiments, shaft 12 includes one or more bearings to facilitate rotation of the shaft. According to one embodiment, the vanes are made of plastic.

According to various embodiments, an automated system for regulating flow of hops into a fermentation vessel for fermenting an alcoholic beverage includes providing a regulator assembly 1400A. Regulator assembly 1400A comprises a hollow cross-shaped connector including a first cylindrical housing intersecting a second cylindrical housing at an approximate right angle with openings therethrough. A shaft 12 is coaxially mounted within the first cylindrical housing, the shaft supporting a hub 16 and uniformly spaced radial vanes 18 at a proximal end, outer ends of each vane adapted to sweep in close engagement with an inner wall of the first cylindrical housing. Regulator assembly 1400A further comprises an actuator 114 coupled to a distal end of the shaft. Actuator 114 is configured to control rotation of the shaft 12 to control flow of hops from a hopper 1500 configured for holding hops into a hatch of a fermentation vessel 1 configured for holding a fermenting fluid. An outlet of the second cylindrical housing sealably connects to the hatch of the fermentation vessel 1. An inlet of the second cylindrical housing sealably connects to an aperture 78 of the hopper 1500. Regulator assembly 1400A further comprises a user interface configured for receiving a user input; and a controller such as microprocessor 104 coupled to the actuator 114, the controller configured to adjust at least one operating parameter associated with the actuator responsive to the user input received at knob 102 of the user interface.

Actuator 114 includes a wireless interface and permits commands to be sent to activate the buttons of actuator 114 wirelessly. In addition to the activation of the buttons, embodiments of the presently disclosed subject matter can allow for various data associated with beer brewing equipment 1100 to be collected and transmitted by an embedded system.

In one embodiment, microprocessor 104 is configured for activating different functions of the regulator assembly 1400A based on real time analysis of data and transferring the results back via a wireless controller for to the central server for display on a graphical user interface (GUI) of a computing device. In various embodiments, microprocessor 104 is configured to include a feedback loop to modify operating parameters in real time based on data captured at regulator assembly 1400A.

In various embodiments, microprocessor 104 is configured for collecting data associated with each of the plurality of components of beer brewing equipment 1100 for display on a graphical user interface (GUI) of a computing device. In various embodiments, microprocessor 104 is configured to communicate data associated with the operations of regulator assembly 1400A to the computing device via a wireless connection thereto.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A regulator assembly for regulating flow of hops into a fermentation vessel for fermenting an alcoholic beverage, comprising:
   a hollow cross-shaped connector including a first cylindrical housing having openings therethrough and intersecting at an approximate right angle a second cylindrical housing having openings therethrough;
   a rotary shaft coaxially mounted within the first cylindrical housing, the shaft supporting a hub and uniformly spaced radial vanes at a proximal end, outer ends of each vane adapted to sweep in close engagement with an inner wall of the first cylindrical housing; and,
   an actuator operably coupled to a distal end of the shaft, whereby the actuator controls rotation of the shaft about a longitudinal axis to control flow of hops from a hopper into a hatch of a fermentation vessel,
   wherein an outlet of the second cylindrical housing sealably connects to the hatch of the fermentation vessel,
   wherein an inlet of the second cylindrical housing sealably connects to an aperture of the hopper; and
   whereby the hollow cross-shaped connector adjoins together the rotary shaft mounted within the first cylindrical housing, the hopper connected to the inlet of the second cylindrical housing, and the fermentation vessel connected to the outlet of the second cylindrical housing, thereby forming a contiguous airtight assembly of the rotary shaft, the hopper, and the fermentation vessel.

2. The regulator assembly of claim 1, wherein the actuator comprises a gear motor that operates to rotate the shaft about a longitudinal axis based on signals supplied by the actuator.

3. The regulator assembly of claim 1, wherein the actuator comprises a timer that can be programmed to operate the actuator to regulate a rotation characteristic of the shaft, such as time of rotation or speed of rotation.

4. The regulator assembly of claim 1, including a valve operably connected to the second cylindrical housing and in proximate relation to the hatch of the fermentation vessel, whereby the valve regulates access from the second cylindrical housing to the hatch of the fermentation vessel.

5. The regulator assembly of claim 1, wherein the hollow cross-shaped connector has internal diameter of approximately 4 inches.

6. The regulator assembly of claim 1, wherein the actuator comprises a timer that can be programmed to activate rotation of the shaft about a longitudinal axis for a first time interval followed by stopping rotation of the shaft for a second time interval followed by rotating the shaft for a third time interval.

7. The regulator assembly of claim 1, wherein ends of the first cylindrical housing include airtight seals.

8. The regulator assembly of claim 1, wherein the shaft includes one or more bearings to facilitate rotation of the shaft.

9. The regulator assembly of claim 1, wherein the hopper includes a valve configured for purging air within the hopper and an enclosed path between the hatch of the fermentation vessel and the aperture of the hopper.

10. The regulator assembly of claim 1, wherein the vanes comprise one or more of: plastic and stainless steel.

11. A method of regulating flow of hops into a fermentation vessel for fermenting an alcoholic beverage, the method comprising:
   providing a regulator assembly comprising:
      a hollow cross-shaped connector including a first cylindrical housing having openings therethrough and intersecting at an approximate right angle a second cylindrical housing having openings therethrough;
      a rotary shaft coaxially mounted within the first cylindrical housing, the shaft supporting a hub and uniformly spaced radial vanes at a proximal end, outer ends of each vane adapted to sweep in close engagement with an inner wall of the first cylindrical housing; and,
      an actuator operably coupled to a distal end of the shaft, whereby the actuator controls rotation of the shaft about a longitudinal axis to control flow of hops from a hopper into a hatch of a fermentation vessel,
      wherein an outlet of the second cylindrical housing sealably connects to the hatch of the fermentation vessel,
      wherein an inlet of the second cylindrical housing sealably connects to an aperture of the hopper;
      whereby the hollow cross-shaped connector adjoins together the rotary shaft mounted within the first cylindrical housing, the hopper connected to the inlet of the second cylindrical housing, and the fermentation vessel connected to the outlet of the second cylindrical housing, thereby forming a contiguous airtight assembly of the rotary shaft, the hopper, and the fermentation vessel;

receiving an input at a user interface; and adjusting, by a controller in communication with the actuator, of at least one operating parameter associated with the actuator responsive to the user input received at the user interface.

\* \* \* \* \*